US007908068B2

(12) United States Patent
Kondou

(10) Patent No.: US 7,908,068 B2
(45) Date of Patent: Mar. 15, 2011

(54) ENGINE CONTROLLER OF HYDRAULIC SHOVEL

(75) Inventor: Masami Kondou, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 227 days.

(21) Appl. No.: 12/092,361

(22) PCT Filed: Oct. 31, 2006

(86) PCT No.: PCT/JP2006/321750

§ 371 (c)(1), (2), (4) Date: Sep. 3, 2008

(87) PCT Pub. No.: WO2007/052658

PCT Pub. Date: May 10, 2007

(65) Prior Publication Data

US 2009/0101107 A1 Apr. 23, 2009

(30) Foreign Application Priority Data

| | | |
|---|---|---|
| Nov. 1, 2005 | (JP) | 2005-318799 |
| Feb. 21, 2006 | (JP) | 2006-044427 |
| Oct. 27, 2006 | (JP) | 2006-293044 |

(51) Int. Cl.
*G06F 7/00* (2006.01)
*G06F 7/04* (2006.01)

(52) U.S. Cl. .......... 701/54; 701/50

(58) Field of Classification Search .......... 123/349, 123/399, 319, 350; 701/50, 54; 180/302
See application file for complete search history.

(56) References Cited

U.S. PATENT DOCUMENTS

| | | | | |
|---|---|---|---|---|
| 5,868,214 | A * | 2/1999 | Workman | 180/179 |
| 7,588,118 | B2 * | 9/2009 | Sawada | 180/302 |

FOREIGN PATENT DOCUMENTS

| | | | |
|---|---|---|---|
| EP | 1 544 440 | A1 | 6/2005 |
| JP | 2001-173024 | A | 6/2001 |
| JP | 2004-150306 | | 5/2004 |
| JP | 2004-150306 | A | 5/2004 |
| JP | 2005-9402 | A | 1/2005 |
| JP | 2005-009431 | | 1/2005 |
| JP | 2005-9431 | A | 1/2005 |

(Continued)

OTHER PUBLICATIONS

Supplementary European Search Report for European Application No. EP 06 82 2679, European Patent Office, mailed Mar. 18, 2009, 4 pgs.

(Continued)

*Primary Examiner* — Mahmoud Gimie
(74) *Attorney, Agent, or Firm* — Sterne, Kessler, Goldstein & Fox P.L.L.C.

(57) ABSTRACT

A hydraulic shovel including a selection means for an engine which is capable of arbitrarily selecting either of an isochronous control and a droop control, and a traveling detection means for detecting the traveling state of a traveling device. The hydraulic shovel further includes a control means for the engine which selects the isochronous control when the traveling detection means detects the traveling state to maintain the rotational speed of the engine during rated operation while an output is increased, and selects the droop control when the traveling detection means does not detect the traveling state to set the rotational speed of the engine lower than that during the rated operation while the output is increased.

5 Claims, 12 Drawing Sheets

FOREIGN PATENT DOCUMENTS

| | | | |
|---|---|---|---|
| WO | WO2004099593 | * | 11/2004 |
| WO | WO 2005/012711 A1 | | 2/2005 |

OTHER PUBLICATIONS

International Search Report for International Application No. PCT/JP2006/321750, Japanese Patent Office, mailed Jan. 9, 2007, 2 pgs.

Patent Abstracts of Japan, abstract of Publication No. JP 2005-009431, Hydraulic Drive System of Working Machine, published Jan. 13, 2005, (listed on accompanying PTO/SB/08A as document FP1).

Patent Abstracts of Japan, abstract of Publication No. JP 2005-009402, Hydraulically Driven Device for Work Unit, published Jan. 13, 2005, (listed on accompanying PTO/SB/08A as document FP2).

Patent Abstracts of Japan, abstract of Publication No. JP 2004-150306, Controller of Engine, published May 27, 2004, (listed on accompanying PTO/SB/08A as document FP3).

Patent Abstracts of Japan, abstract of Publication No. JP 2001-173024, Hybrid System for Construction Machine, published Jun. 26, 2001, (listed on accompanying PTO/SB/08A as document FP4).

* cited by examiner

ENGINE CONTROLLER OF HYDRAULIC SHOVEL

BACKGROUND OF THE INVENTION

1. Field of the Invention

The present invention relates to the art of reducing fuel consumption and noise of an engine driving a construction machine such as a hydraulic shovel.

2. Background Art

Conventionally, various prior art for the purpose of improving work of a hydraulic shovel is disclosed and known.

In order to improve shovel work, there exists various methods and devices to improve the efficiency of hydraulic circuit structure driving vertical movement of a boom and an arm of a hydraulic shovel and turning of a main body of the hydraulic shovel so as to reduce fuel consumption, there also exists various methods and devices that ration flow amount of a hydraulic pump of a hydraulic circuit driving vertical movement of a boom and an arm of a hydraulic shovel so as to reduce output loss and reduce fuel consumption. Several of these methods are disclosed by the applicant of the present invention and are well-known.

In an embodiment, in order to improve traveling a hydraulic vehicle has low or high traveling speed switching function or automatic two-speed function which reduces shock at the time of stopping of low speed traveling. Embodiments improving output of a hydraulic pump driving a traveling system at the time of traveling are disclosed.

BRIEF SUMMARY OF THE INVENTION

Problems to Be Solved by the Invention

According to the effects of the above-mentioned arts, required capacity is secured while reducing engine output at the time of shovel work.

However, basic performance such as hill climbing speed and turning speed of the hydraulic shovel is determined at rated output. In the existing circumstances, engine rated output is determined on condition of securing traveling performance. Then, also at the time of shovel work, drive is performed in the rated output range, and as a result, output is excessive and output loss is generated.

The output loss caused by the excessive output cannot be solved by the above-mentioned prior art and there is yet room for further improvement.

In consideration of the above-mentioned conditions, the purpose of the present invention is to provide an improvement in fuel economy and a reduction in noise during the operation of a hydraulic shovel while securing traveling performance.

Means for Solving the Problems

The above-mentioned problems are solved by the following means.

An engine controller of a hydraulic shovel according to the present invention comprises an engine rotation selection means optionally selecting one of isochronous control and droop control, and a detection means detecting traveling state of a traveling device. The engine controller is characterized in that when the detection means detects traveling state, the isochronous control is selected and engine rotation speed at rated driving is maintained at a time of increase of output, and when the detection means does not detect traveling state, the droop control is selected and engine rotation speed at a time of increase of output is lower than engine rotation speed at the rated driving.

With regard to the engine controller of the hydraulic shovel according to the present invention, engine rotation speed of minimum output at the time of selecting the isochronous control is substantially equal to engine rotation speed of minimum output at the time of selecting the droop control.

With regard to the engine controller of the hydraulic shovel according to the present invention, the detection means also serves as an alarm means notifying circumference about traveling state.

With regard to the engine controller of the hydraulic shovel according to the present invention, a mode selection means selecting one of economy mode and normal mode is provided, and when the economy mode is selected, engine rotation speed is set lower than engine rotation speed at the rated driving.

EFFECT OF THE INVENTION

An engine controller of a hydraulic shovel according to the present invention comprises an engine rotation selection means optionally selecting one of isochronous control and droop control, and a detection means detecting traveling state of a traveling device. The engine controller is characterized in that when the detection means detects traveling state, the isochronous control is selected and engine rotation speed at rated driving is maintained at a time of increase of output, and when the detection means does not detect traveling state, the droop control is selected and engine rotation speed at a time of increase of output is lower than engine rotation speed at the rated driving. Accordingly, at the time of shovel work, drive is performed with subminimal engine output, whereby output loss is reduced and fuel consumption is reduced. At the time of traveling, drive is performed with rated engine output, whereby traveling performance is secured.

With regard to the engine controller of the hydraulic shovel according to the present invention, engine rotation speed of minimum output at the time of selecting the isochronous control is substantially equal to engine rotation speed of minimum output at the time of selecting the droop control. Accordingly, engine rotation speed is not changed at the time of switching between the working state and the traveling state, whereby operation feeling is maintained and an operator is not given an unpleasant feeling.

With regard to the engine controller of the hydraulic shovel according to the present invention, the detection means also serves as an alarm means notifying circumference about traveling state. Accordingly, part number of the engine controller is reduced so as to reduce production cost.

With regard to the engine controller of the hydraulic shovel according to the present invention, a mode selection means selecting one of economy mode and normal mode is provided, and when the economy mode is selected, engine rotation speed is set lower than engine rotation speed at the rated driving. Accordingly, fuel consumption and noise at the time of shovel work are further reduced without spoiling operation feeling.

DETAILED DESCRIPTION OF THE INVENTION

Figure 1:
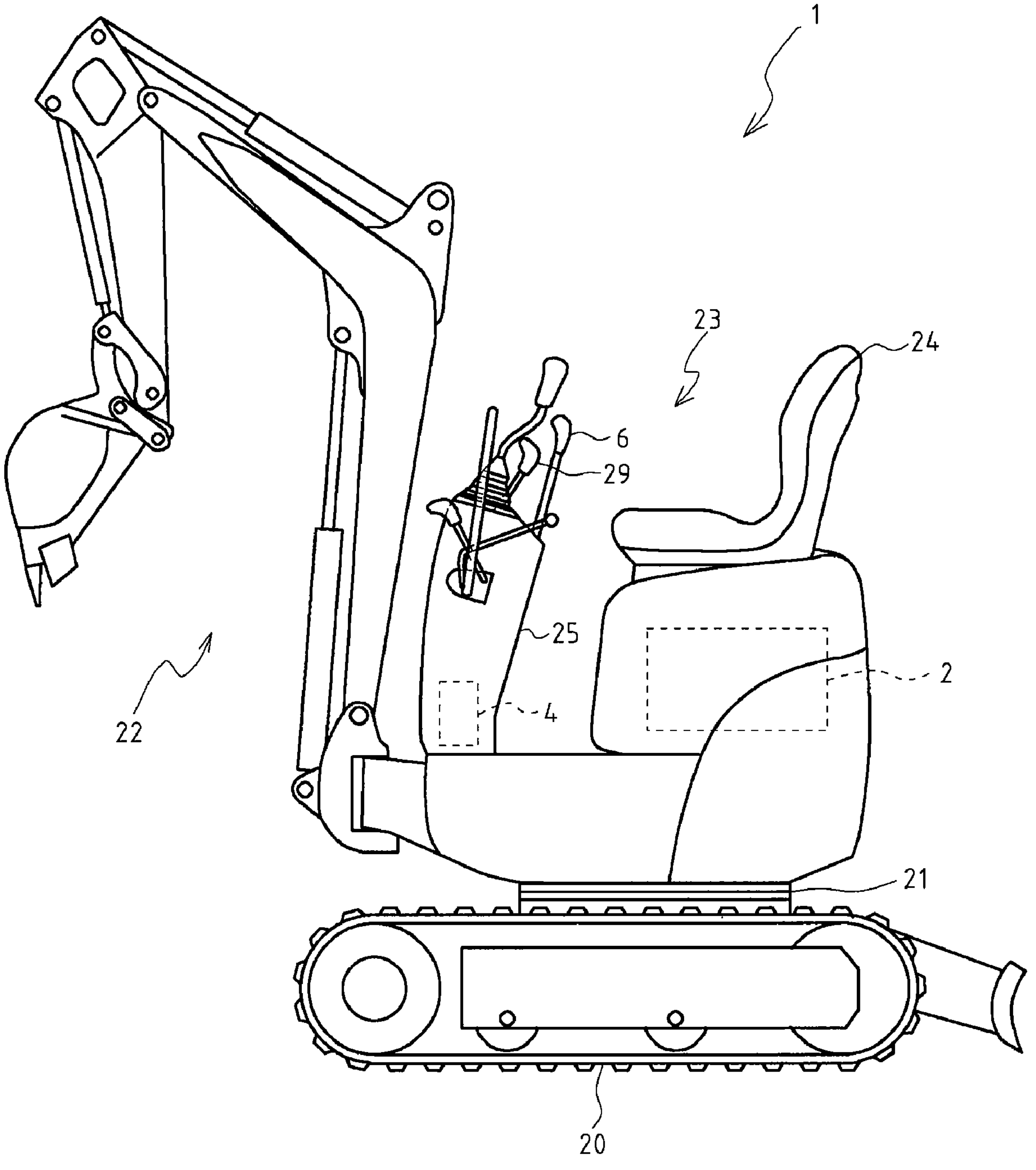
FIG. 1 is a side view of entire construction of a hydraulic shovel according to an embodiment of the present invention.

Next, explanation will be given to embodiments of the present invention.

Dots and ranges shown in FIGS. 1 to 12 indicate respectively working output torque 50, lowest required torque 51, idling rotation speed 52, unloaded area 53, working rotation speed 54, rated rotation speed 55, unloaded rotation speeds 56 and 57, special working rotation speed 58, normal mode maximum rotation speed 59 and economy mode maximum rotation speed 60.

First, explanation will be given on an entire construction of a hydraulic shovel according to an embodiment of the present invention referring to FIGS. 1 to 4.

As shown in FIG. 1, with regard to a hydraulic shovel 1, a swivel base 21 is provided on a crawler traveling device 20 so as to be able to swivel. An engine 2, an operation part 23 and the like are arranged on the swivel base 21. An excavator 22 is disposed on the front portion of the swivel base 21. A seat 24 is arranged in the operation part 23, and an operation column 25 is disposed in the operation part 23 before the seat 24. A traveling lever 6 is arranged on the operation column 25. A traveling detection means 4 constructed by a switch or the like is arranged in a basal portion of rotation of the traveling lever 6 so as to detect traveling operation. However, the traveling detection means and the position thereof are not limited thereto. Rotation of an axle may be detected by a rotation sensor, and a pressure switch may be arranged in a traveling motor driving oil passage of a hydraulic circuit.

Figure 2:
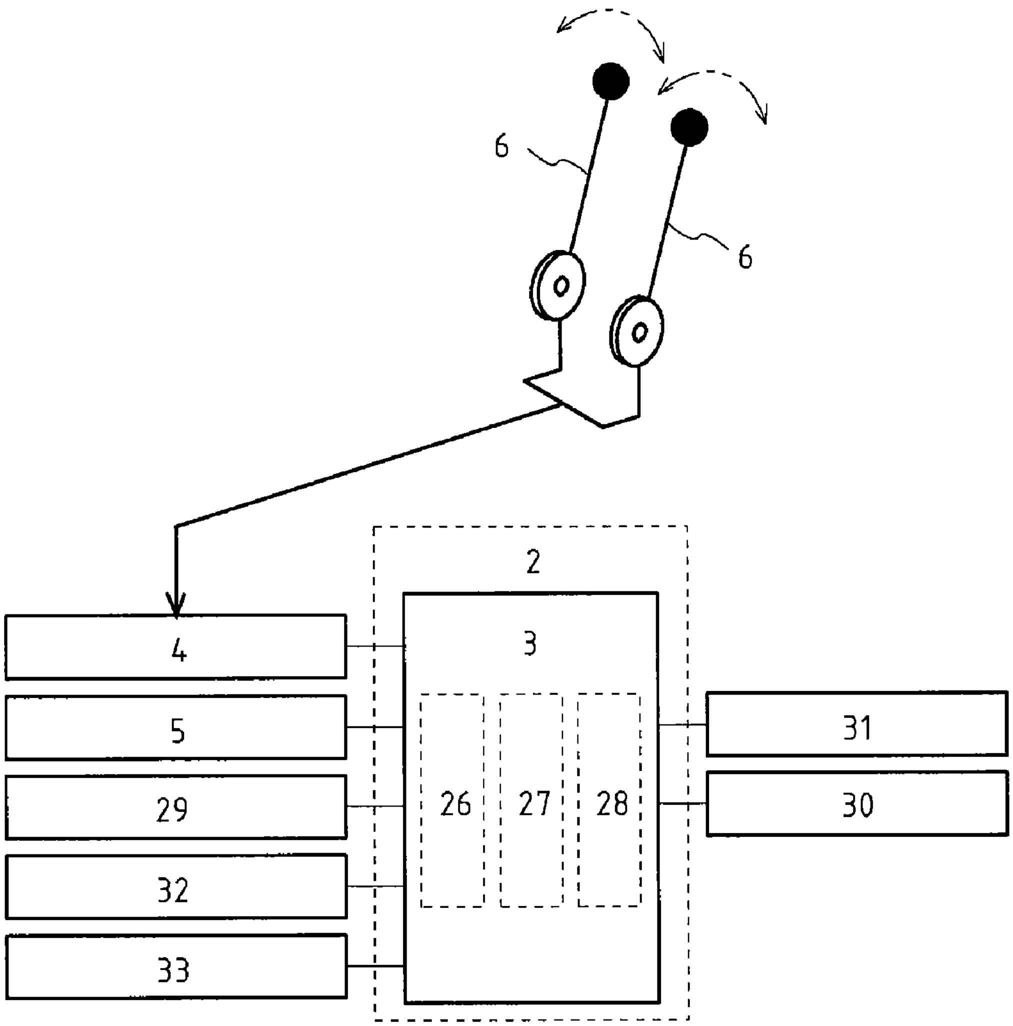
FIG. 2 is a drawing of a control system of the hydraulic shovel according to the embodiment of the present invention.

As shown in FIG. 2, a control means 3 controlling rotation of the engine 2 comprises a central processing unit (CPU) 26, a storage means (RAM, ROM) 27, a selection means 28 and the like. The traveling detection means 4, a setting means (accelerator lever) 29 setting rotation speed, an alarm means 5, a rotation speed sensor 30 which is a means detecting rotation speed, an actuator 31 controlling amount and timing of fuel injection, a switching means 32 and the like are connected to the control means 3.

The storage means 27 stores a plurality of engine output characteristics as maps. The engine output characteristics are switched automatically by the selection means 28 following contents of work, traveling state and the like, and can be selected optionally by the switching means 32 such as a button or a switch. When the traveling lever 6 is operated, the traveling detection means 4 transmits a signal to the control means 3 so that traveling state is detected. Simultaneously, the traveling alarm means 5 is actuated. The traveling alarm means 5 and the traveling detection means 4, which are connected directly to each other conventionally, are connected to the control means 3 so that the traveling detection means 4 is used for switching of the selection means 28 and actuation of the traveling alarm means 5 and also serves as a detection means.

Figure 3:
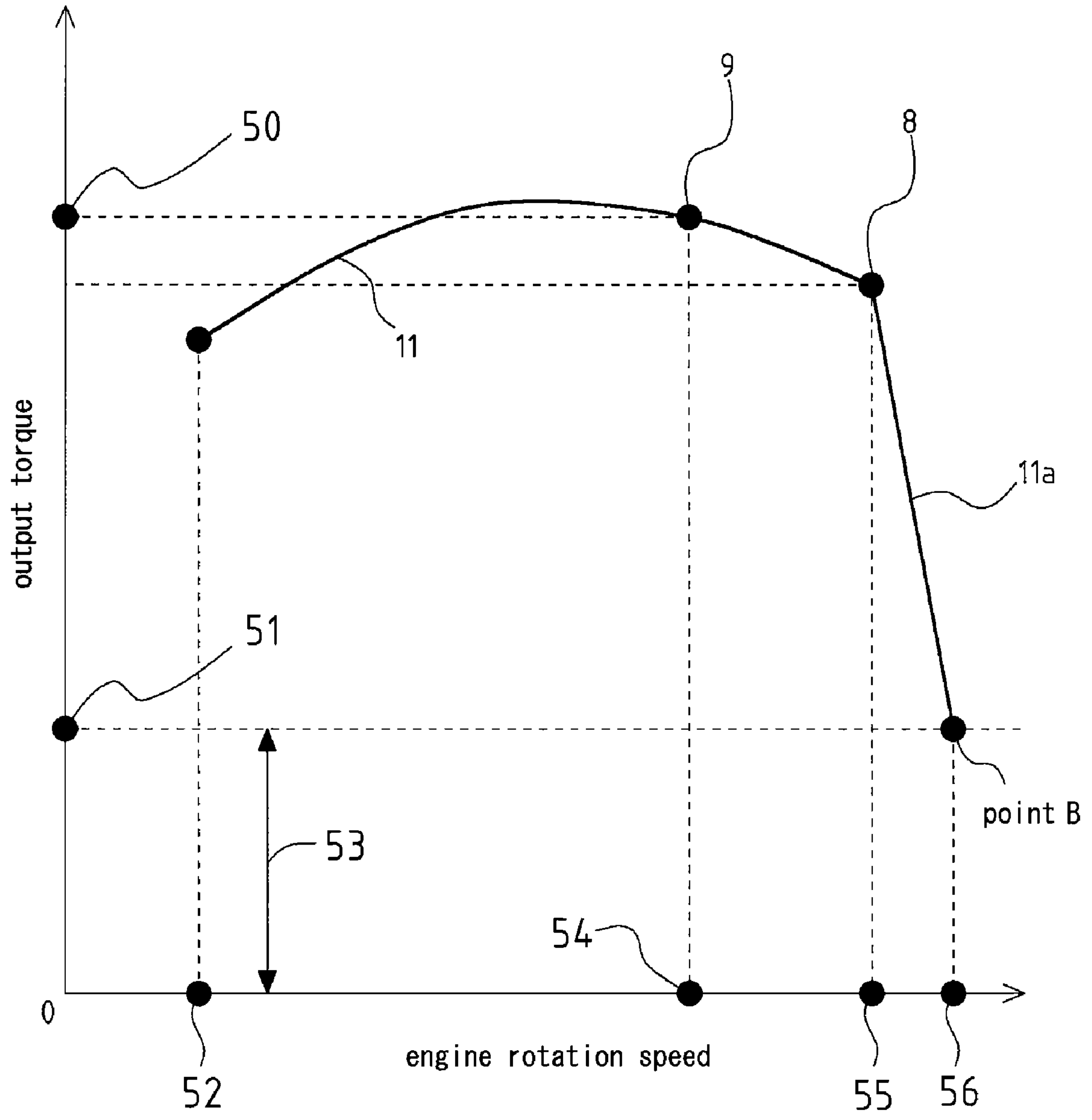
FIG. 3 is an output line of relation between output torque and engine rotation speed of a hydraulic shovel to which the present invention is not adopted.
Figure 4:
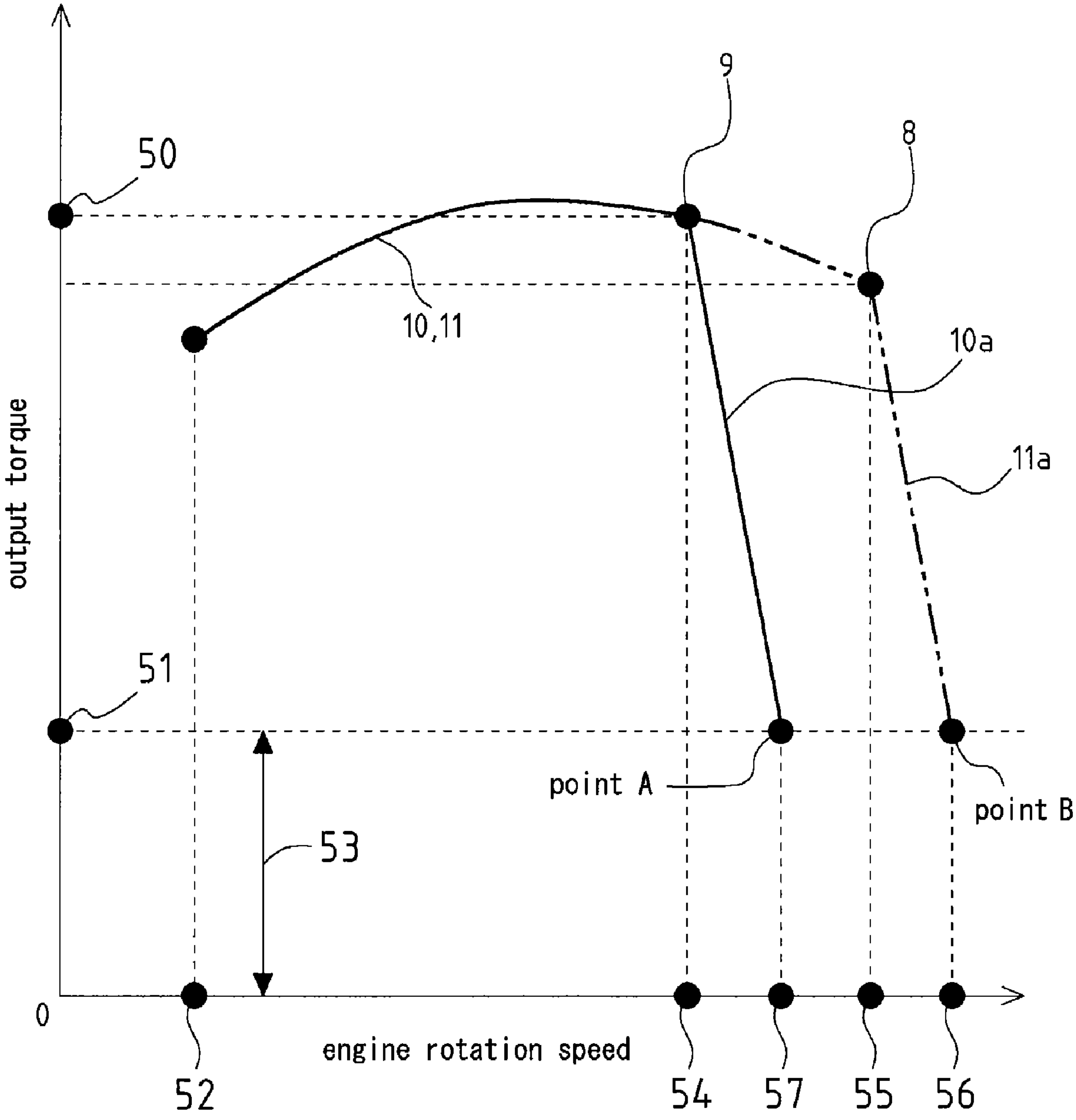
FIG. 4 is an output line of relation between output torque and engine rotation speed of a hydraulic shovel to which the present invention is not adopted in the case that engine output characteristic is changed at shovel work and at traveling.

The storage means of the control means 3 stores traveling output lines 11 and 11*a* shown in FIG. 3 and working output lines 10 and 10*a* shown in FIG. 4, and these lines are switched at the time of traveling and working by the selection means 28.

As shown in FIG. 3, in the existing circumstances, rated output of the hydraulic shovel 1 is determined corresponding to output required for securing traveling performance, and drive is performed in the vicinity of a rated output point 8. However, at the time of shovel (excavation) work, it is ideal to drive in the vicinity of a working output point 9 at which engine rotation speed is lower than that at the rated output point 8. Namely, in the existing circumstances, drive is performed at excessive high engine rotation speed and loss of output is generated.

Then, as shown in FIG. 4, the hydraulic shovel travels with the output characteristic of the traveling output lines 11 and 11*a* and works with the output characteristic of the working output lines 10 and 10*a*. The setting means (accelerator lever) 29 is rotated to working area at the time of traveling and working. In this state, at the time of traveling, the output characteristic is switched by the selection means 28, and engine rotation speed rises to the rated output point 8 as the traveling output line 11*a* and rises to a point B slightly higher than the rated output point at the no load state. At the time of working, the output characteristic is switched by the selection means 28, and engine rotation speed rises to the working output point 9 as the traveling output line 10*a* and rises to a point A at the no load state.

Next, explanation will be given on concrete control.

As shown in FIGS. 2 and 4, when the engine 2 is started and the setting means (accelerator lever) 29 is rotated to working area from idling state, engine rotation speed is raised to the working output point 9. When the traveling lever 6 is operated, the traveling detection means 4 detects the operation and inputs it to the control means 3. The control means 3 changes the traveling output line 10*a* to the traveling output line 11*a* by the selection means 28, and the control means 3 actuates the actuator 31 and the like so as to raise rotation speed of the engine 2 to the rated output point 8. The engine rotation speed is detected by rotation speed sensor 30 and is feedback-controlled.

In contrast with the above-mentioned operation, when the traveling lever 6 is released, the traveling output line 11*a* is changed to the traveling output line 10*a*.

Accordingly, by normal operation, drive is performed with output characteristic optimum to traveling state without being conscious of switching of the output lines.

At the time of shovel work, drive is performed with subminimal engine output, whereby output loss is reduced and fuel consumption is reduced. At the time of traveling, drive is performed with rated engine output, whereby traveling performance is secured.

The engine output characteristic is switched automatically, whereby operability is maintained.

Engine rotation speed at the no load state of each of a plurality of the engine output characteristics may be set substantially equal to each other.

As mentioned above, the engine output characteristic is controlled following driving state so that fuel consumption is reduced and traveling performance is secured while maintaining operability.

However, when the output lines 10*a* and 11*a* shown in FIG. 4 are adopted, the output characteristic is changed automatically from the traveling output line 10*a* to the traveling output line 11*a* instantaneously, and the traveling state point on the diagram is moved from the point A to the point B (otherwise, from the point B to the point A) instantaneously. Therefore, engine rotation speed is changed suddenly and an operator is given an unpleasant feeling.

Figure 5:
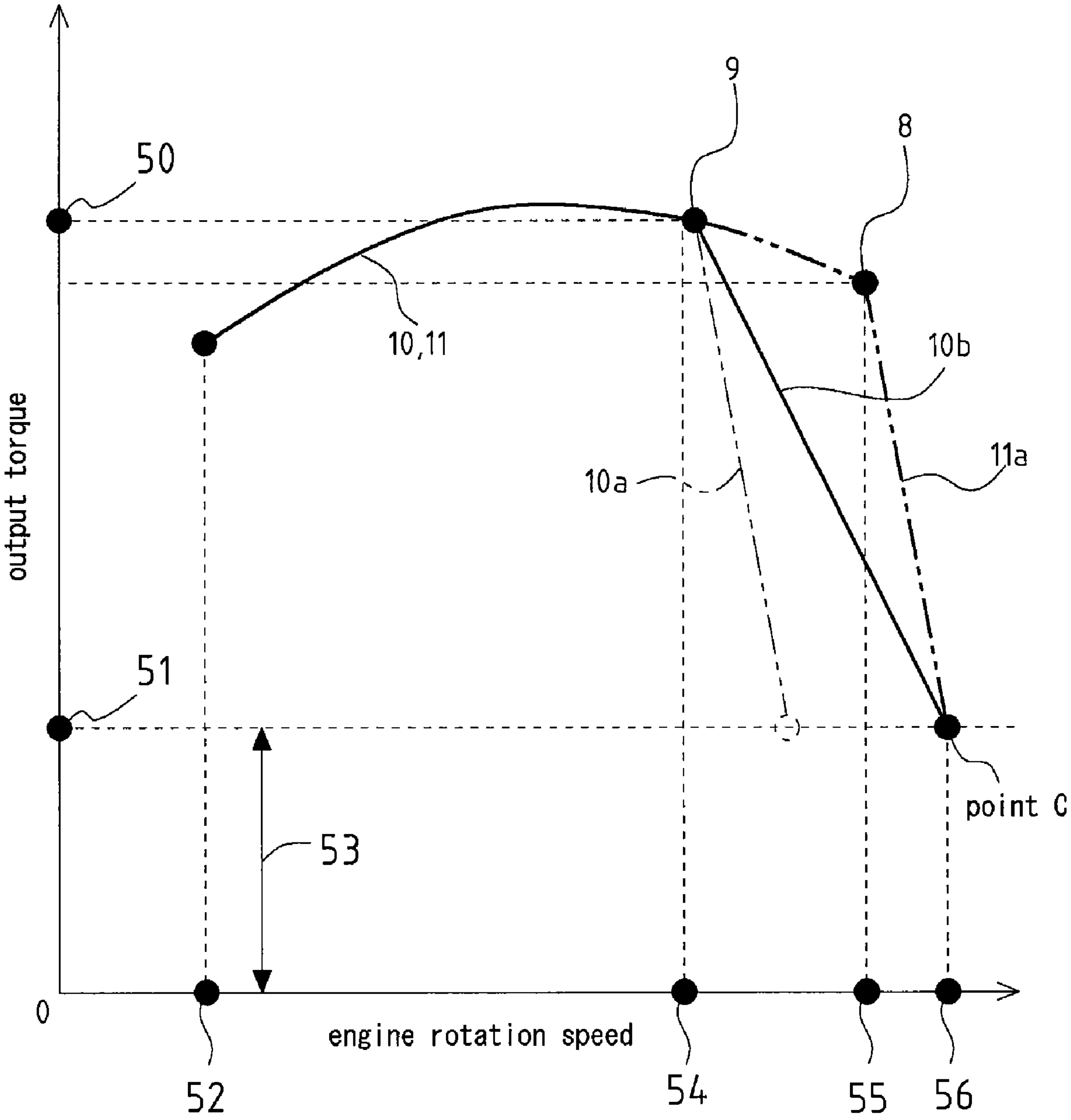
FIG. 5 is an output line of relation between output torque and engine rotation speed of the hydraulic shovel according to the embodiment of the present invention in the case that engine output characteristic is changed at shovel work and at traveling.

Then, as shown in FIG. 5, a working output line 10*b* that engine rotation speed at the no load state (point C) at the time of traveling is substantially equal to that at the time of working is set so as to cancel sudden change of engine rotation speed following automatic change of the output line.

Engine rotation speed is not changed at the time of switching between the working state and the traveling state, whereby operation feeling is maintained and an operator is not given an unpleasant feeling.

Explanation will be given on the construction that engine rotation speed at the rated output is set substantially equal to engine rotation speed at the no load state with regard to the engine output characteristic reaching the engine rated output.

As mentioned above, the output lines 10*b* and 11*a* that engine rotation speed at the no load state is equal to each other are adopted so as to cancel sudden change of engine rotation speed following automatic change of the output line.

However, when the output lines 10*b* and 11*a* shown in FIG. 5 are adopted, engine rotation speed at the no load state is higher than engine rotation speed at the rated output at the traveling state, whereby noise at the no load state is loud. Therefore, driving noise value of the hydraulic shovel 1 is large.

Figure 6:
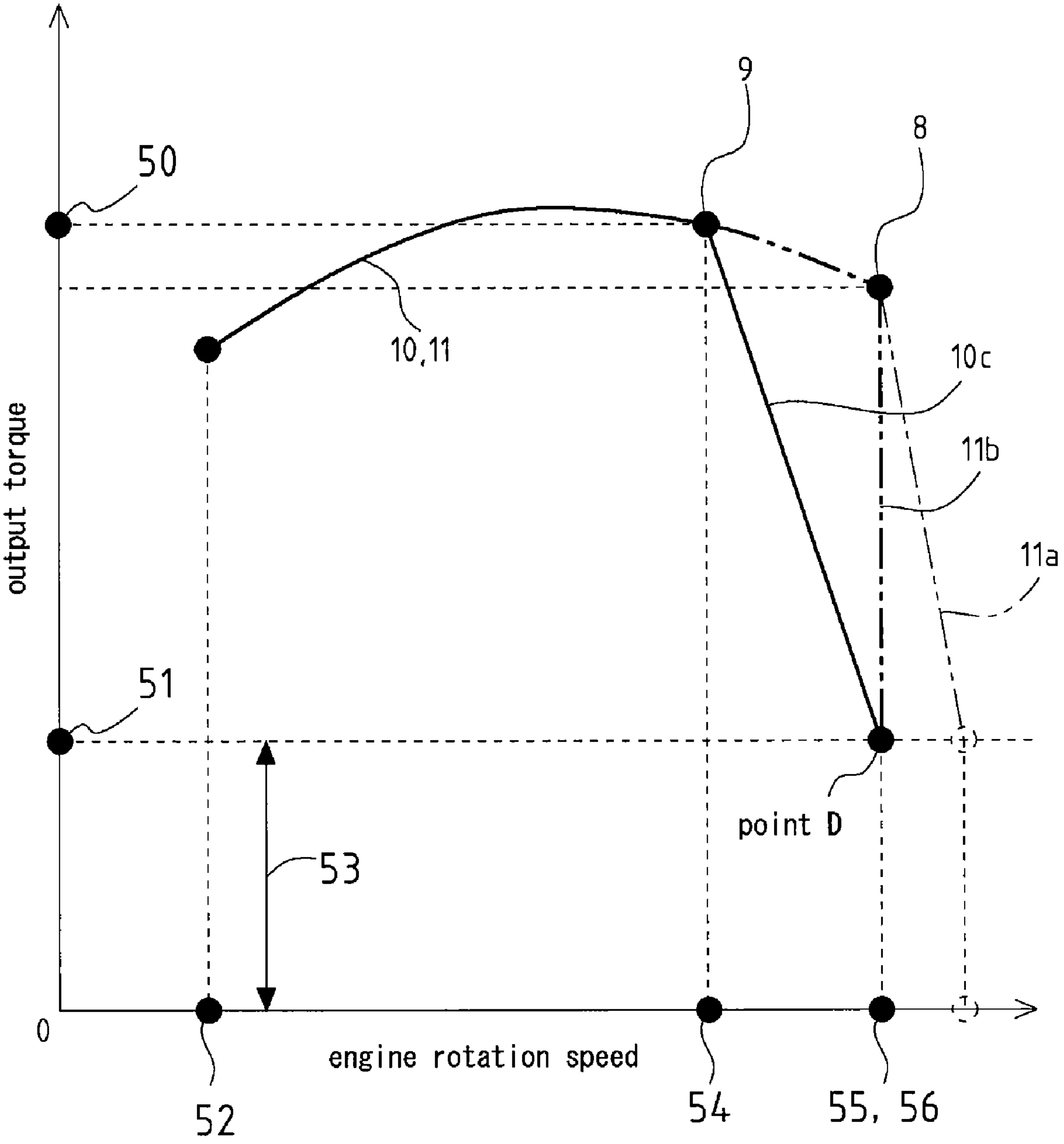
FIG. 6 is an output line of relation between output torque and engine rotation speed of the hydraulic shovel according to the embodiment of the present invention in the case that engine rotation speed at a rated output point of traveling is substantially equal to that of unloaded condition.

Then, as shown in FIG. 6, a traveling output line 11*b* is set having an isochronous line that engine rotation speed (point D) at the no load state (that is, at the minimum output) is substantially equal to engine rotation speed at the rated output (that is, isochronous control is performed) so that noise value at the minimum output at the traveling state is reduced to that at the rated output driving. Accordingly, noise at the time of traveling is reduced.

Compared with FIG. 5, the rated output point 8 which is the traveling output point is not changed, whereby traveling performance is maintained.

The isochronous line shows the state that set speed (that is, rotation speed) is fixed regardless of change of load.

As shown in FIG. 6, a working output line 10*c* is set having a droop line that engine rotation speed (point D) at the no load state (that is, at the minimum output) is substantially equal to engine rotation speed at the rated output (that is, droop control is performed) so that noise value at the minimum output at the working state is reduced to that at the rated output driving. Accordingly, noise at the time of low output working is reduced.

Compared with the working output line 10*b* shown in FIG. 5, engine rotation speed is reduced especially at the time of low output working by adopting the working output line 10*c* shown in FIG. 6, whereby fuel consumption is reduced.

The droop line shows the state that set speed (that is, rotation speed) is reduced following increase of load.

With regard to the engine control device (control means 3) of the hydraulic shovel 1 comprising the selection means 28 of the engine 2 which selects optionally one of the isochronous control and the droop control and the traveling detection means 4 which detects traveling state of the traveling device 20, when the traveling detection means 4 detects traveling state, the isochronous control is selected and engine rotation speed at the rated driving is maintained at the time of increase of output. When the traveling detection means 4 does not detect traveling state, the droop control is selected and engine rotation speed at the time of increase of output is lower than engine rotation speed at the rated driving.

Accordingly, at the time of shovel work, drive is performed with subminimal engine output, whereby output loss is reduced and fuel consumption is reduced. At the time of traveling, drive is performed with the rated engine output, whereby traveling performance is secured.

At this time, as shown in FIG. 6, the working output line 10*c* and the traveling output line 11*b* are set that engine rotation speed at the time of traveling is substantially the same as engine rotation speed at the no load state (point D) similarly to FIG. 5 so as to cancel sudden change of engine rotation speed following automatic change of the output line.

Namely, engine rotation speed at the minimum output in the case of selecting the isochronous control is substantially equal to engine rotation speed at the minimum output in the case of selecting the droop control so that engine rotation speed is not changed at the time of switching between the working state and the traveling state, whereby operation feeling is maintained and an operator is not given an unpleasant feeling.

Explanation will be given on the construction that a plurality of the engine output characteristics includes engine output characteristic with engine rotation speed lower than that of the engine output characteristic not reaching engine rated output.

Each of attachments not only for excavation but also for the other works, such as a crusher crushing rocks and the like can be attached to the hydraulic shovel 1. Compared with normal working state, at the time of work with the attachment, required rotation speed at small load is large and required rotation speed at large load is small. Therefore, when the working output line 10*b* shown in FIG. 6 is adopted, drive is performed at unnecessary output range (that is, excessive engine rotation speed), whereby output loss is generated.

Figure 7:
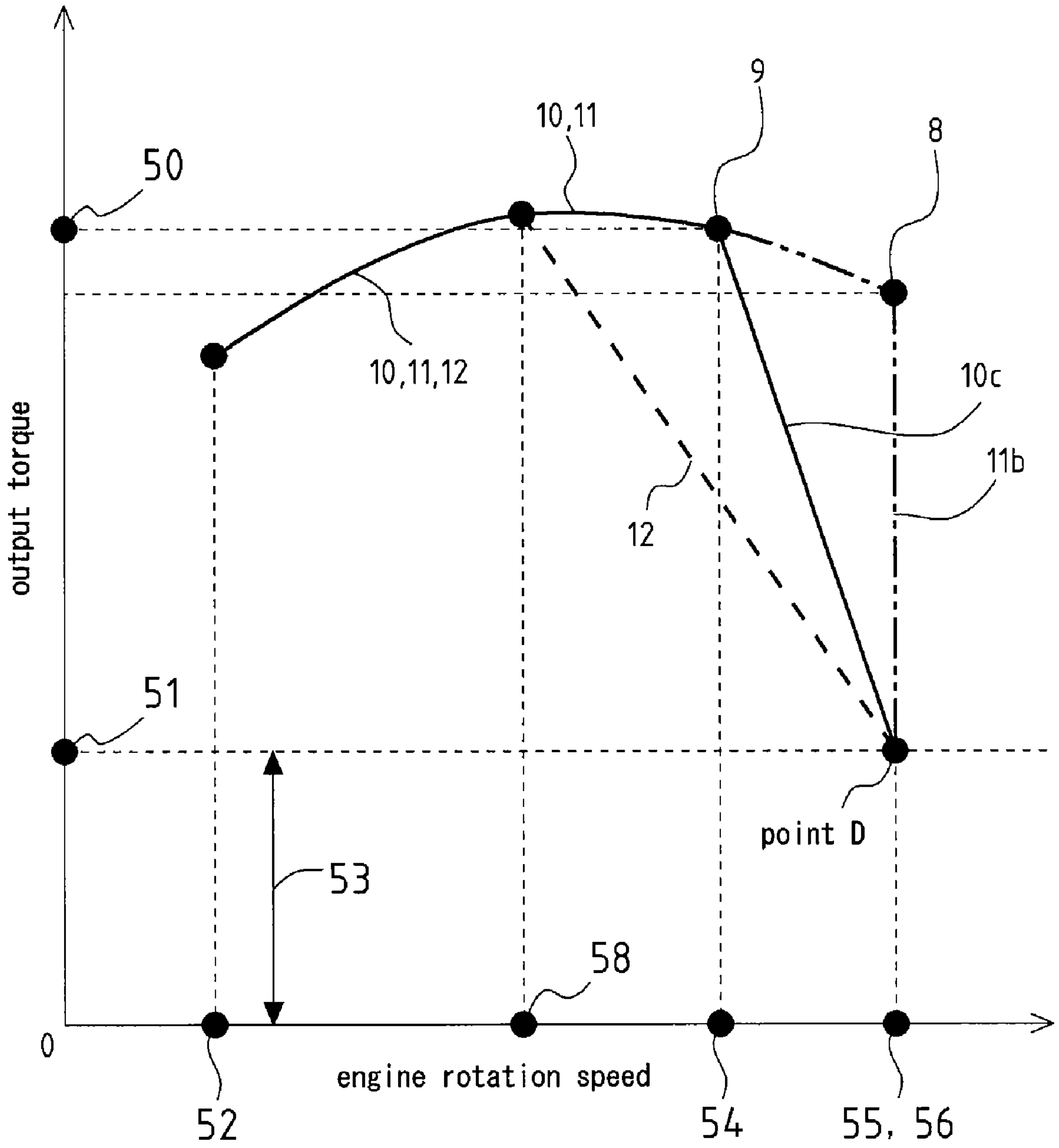
FIG. 7 is an output line of relation between output torque and engine rotation speed suitable for work with an attachment according to the embodiment of the present invention.

Then, as shown in FIG. 7, a special working output line 12 is set as a third output line in consideration with work with the attachment, and the switching means 32 is switched following the work. Accordingly, operation corresponding to required torque output and required speed of the work with the attachment is enabled, whereby fuel consumption is reduced further.

Namely, at the work with the attachment, drive is also performed with optimal engine output characteristic. Fuel consumption is reduced further.

Generally, the hydraulic shovel 1 comprises the traveling alarm means 5 as a means notifying the circumference that the hydraulic shovel 1 is traveling so as to evade personal minor collision at traveling and turning.

As shown in FIG. 2, similarly to the switching of the working output lines 10*b* and 10*c*, with regard to transition to the traveling state, the traveling detection means 4 detects operation of the traveling lever 6 and a signal is transmitted from the traveling detection means 4 to the traveling alarm means 5 so as to switch operation and unoperation of the traveling alarm means 5 suitably. The control means 3 and the traveling alarm means 5 are common to each other at the point that operation thereof is switched corresponding to whether the hydraulic shovel 1 is in traveling state or not. Then, it is consistent functionally to use the traveling detection means 4 in common as a means generating and transmitting a signal.

The traveling alarm means 5 is a function normally provided in the hydraulic shovel 1. Then, by using the traveling detection means 4 in common between the traveling alarm means 5 and the control means 3, part number required for adding a new function is reduced.

The traveling detection means 4 is also used for the traveling alarm means 5 notifying the circumference about the traveling state, whereby part number is reduced and cost is reduced.

Next, explanation will be given on an embodiment (embodiment 1) constructed by further improving the output line shown in FIG. 6 referring to FIG. 8.

Figure 8:
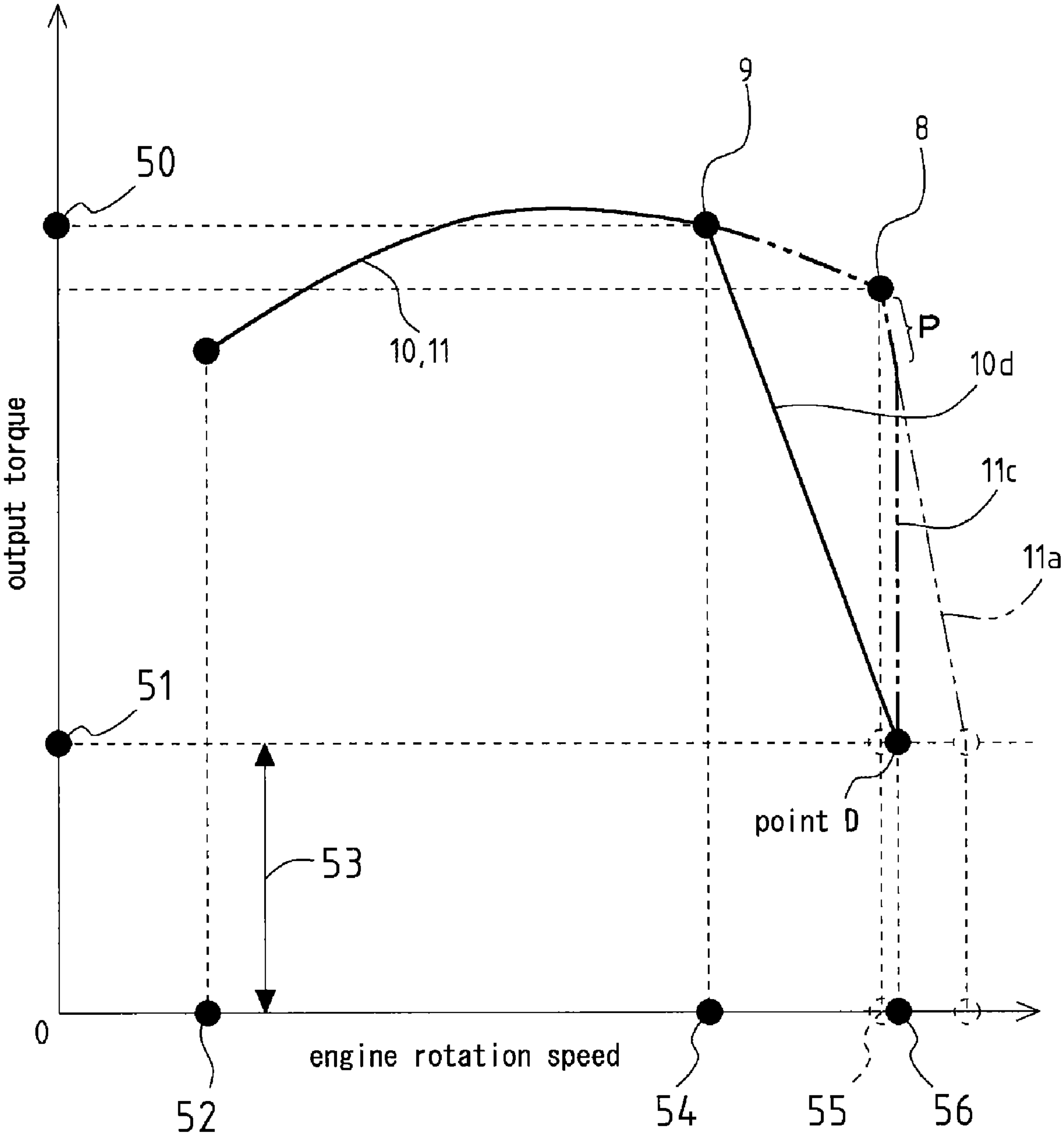
FIG. 8 is an output line of relation between output torque and engine rotation speed of an improved embodiment (embodiment 1).

As shown in FIG. 8, a traveling output line 11*c* is set so that rotation speed at the no load state is slightly higher than that of the output line of FIG. 6, output torque is increased while the rotation speed is maintained, and just before reaching the rated output point 8, the rotation speed is droop-controlled (a part P in FIG. 8) to reach the rated output rotation speed.

At the time of traveling, the output characteristic of the traveling output lines 11 and 11*c* is adopted, and at the time of working, the output characteristic of the working output lines 10 and 10*c* (from a point D to the working output point 9) is adopted. Accordingly, similarly to the case that the output line of FIG. 6 is adopted, drive is performed with subminimal engine output at the time of shovel work, whereby loss of output is reduced and fuel consumption is reduced. Furthermore, drive is performed with the rated engine output at the time of traveling, whereby traveling performance is secured.

In this case, noise at the no load state is slightly high. However, rotation speed at the no load state is made to differ from rotation speed at the rated output point 8 so that confirmation and adjustment of the rated output point 8 at the time of shipment, maintenance and the like are made easy, whereby utility is improved.

Explanation has been given on the embodiment (embodiment 1) constructed by further improving the output line shown in FIG. 6 as the above.

Next, explanation will be given on an embodiment (embodiment 2) constructed by further improving the output line shown in FIG. 6 referring to FIG. 9.

Figure 9:
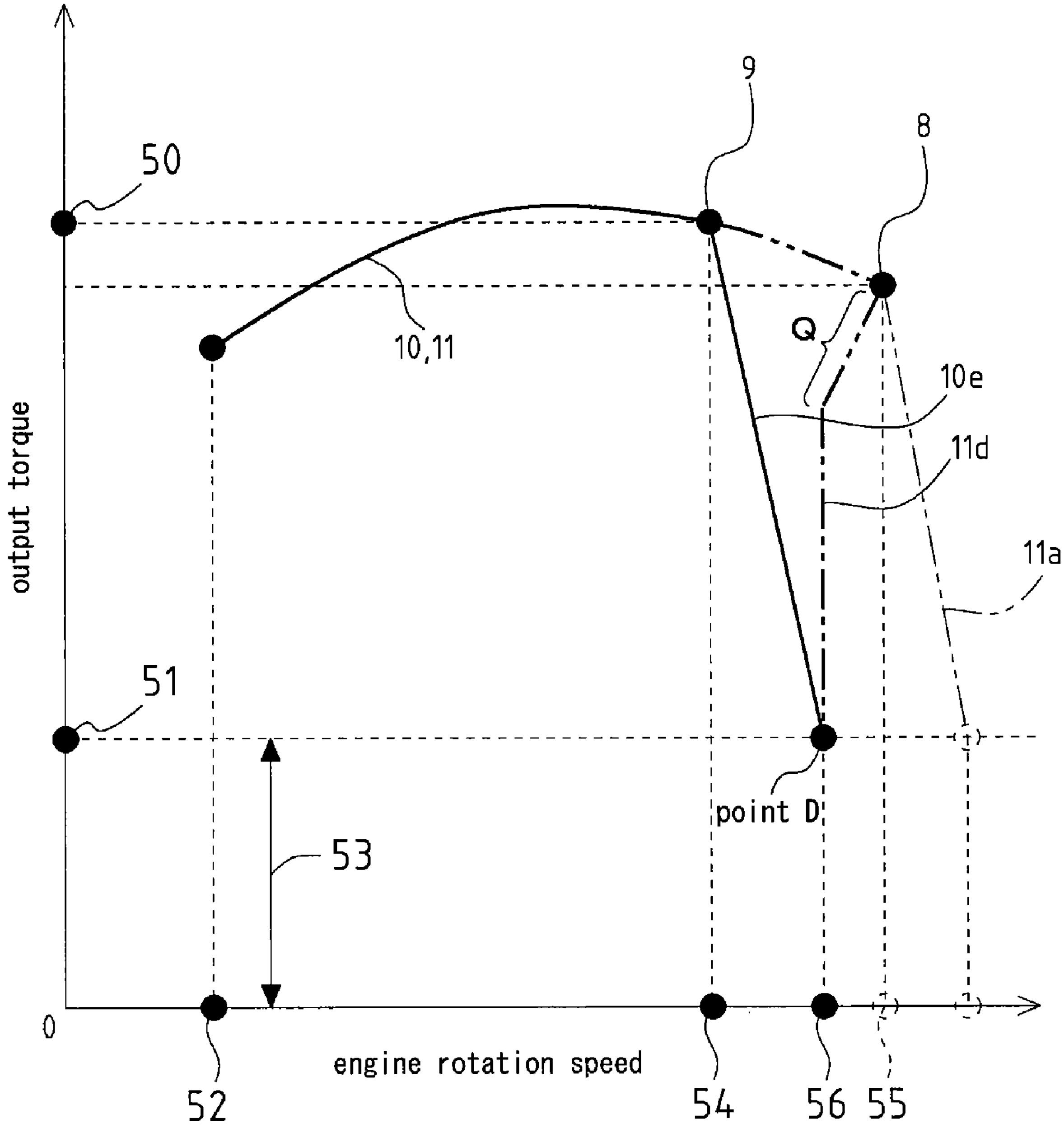
FIG. 9 is an output line of relation between output torque and engine rotation speed of an improved embodiment (embodiment 2).

As shown in FIG. 9, a traveling output line 11*d* is set so that rotation speed at the no load state is set lower than that of the output lines of FIGS. 6 and 8 (higher than rotation speed at the time of working), output torque is increased while the rotation speed is maintained, and just before reaching the rated output point 8, the rotation speed is reverse droop-controlled (a part Q in FIG. 9) to reach the rated output rotation speed. The reverse droop control increases engine rotation speed between the no load state and the maximum load state.

At the time of traveling, the output characteristic of the traveling output lines 11 and 11*d* is adopted, and at the time of working, the output characteristic of the working output lines 10 and 10*d* is adopted. Accordingly, similarly to the case that the output line of FIG. 6 is adopted, drive is performed with subminimal engine output at the time of shovel work, whereby loss of output is reduced and fuel consumption is reduced. Furthermore, drive is performed with the rated engine output at the time of traveling, whereby traveling performance is secured.

In this case, rotation speed at the no load state is set lower than rotation speed at the rated output point 8 so that fuel consumption and noise at the no load state are reduced further.

Explanation has been given on the embodiment (embodiment 2) constructed by further improving the output line shown in FIG. 6 as the above.

Next, explanation will be given on an embodiment (embodiment 3) constructed by further improving the output line shown in FIG. 6 referring to FIG. 10.

Figure 10:
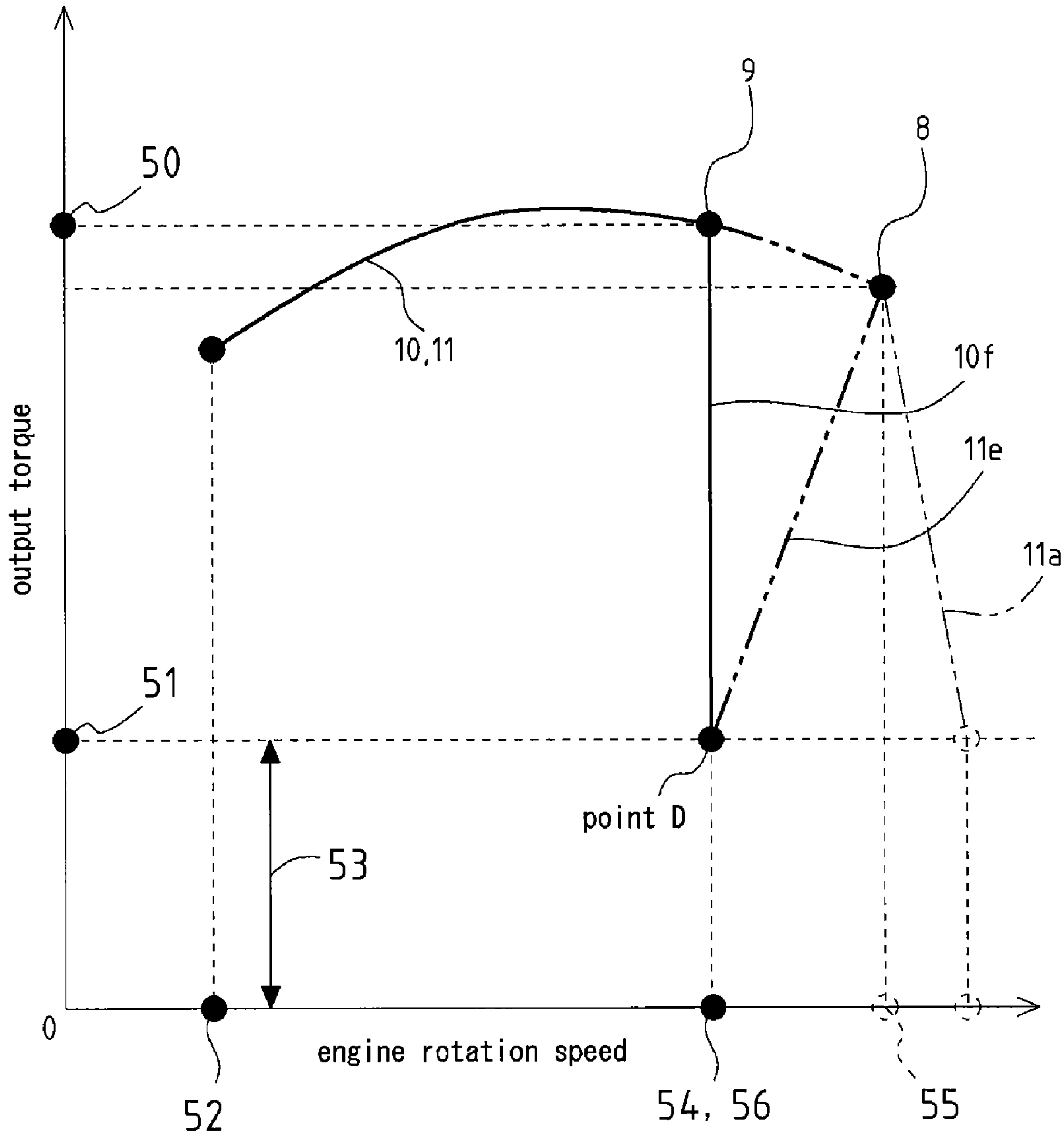
FIG. 10 is an output line of relation between output torque and engine rotation speed of an improved embodiment (embodiment 3).

As shown in FIG. 10, a traveling output line 11*e* is set so that rotation speed at the no load state is set lower than that of the output lines of FIGS. 6, 8 and 9 (rotation speed at the time of working), and the rotation speed is reverse droop-controlled to reach the rated output rotation speed at the rated output point 8. A working output line 10*e* is set so that rotation speed is isochronous-controlled to reach the working output rotation speed at the working output point 9.

At the time of traveling, the output characteristic of the traveling output lines 11 and 11*e* is adopted, and at the time of working, the output characteristic of the working output lines 10 and 10*e* is adopted. Accordingly, similarly to the case that the output line of FIG. 6 is adopted, drive is performed with subminimal engine output at the time of shovel work, whereby loss of output is reduced and fuel consumption is reduced. Furthermore, drive is performed with the rated engine output at the time of traveling, whereby traveling performance is secured.

In this case, compared with the embodiment 2, rotation speed at the no load state is set further lower than rotation speed at the rated output point 8 so that fuel consumption and noise at the no load state are reduced further.

Explanation has been given on the embodiment (embodiment 3) constructed by further improving the output line shown in FIG. 6 as the above.

Next, explanation will be given on an embodiment (embodiment 4) constructed by further improving the output line shown in FIG. 6 referring to FIG. 11.

Figure 11:
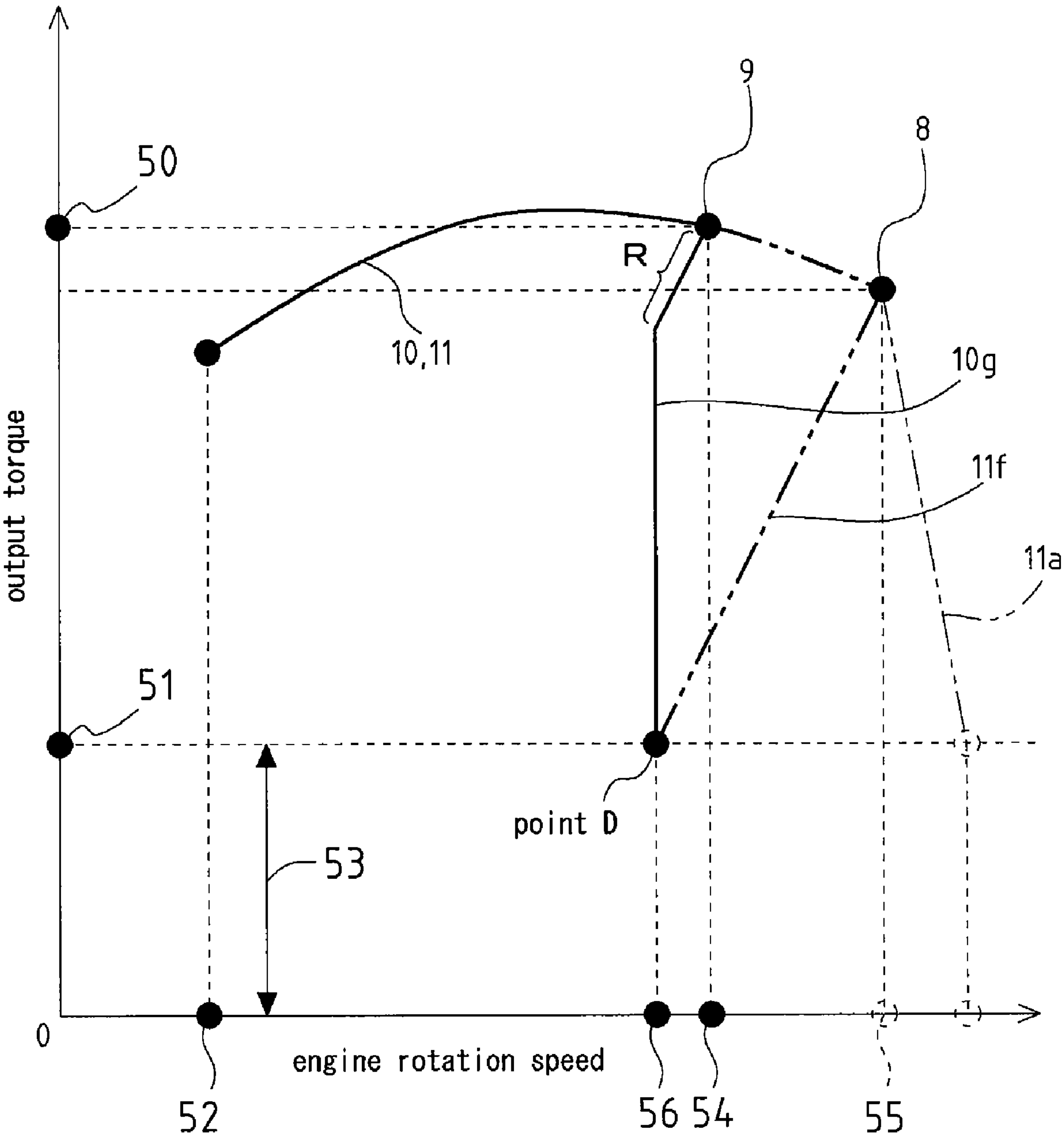
FIG. 11 is an output line of relation between output torque and engine rotation speed of an improved embodiment (embodiment 4).

As shown in FIG. 11, a traveling output line 11*f* is set so that rotation speed at the no load state is set lower than rotation speed at the time of working compared with the output lines of FIGS. 6, 8 to 10, and the rotation speed is reverse droop-controlled to reach the rated output rotation speed at the rated output point 8. A working output line 10*f* is set so that torque is increased while the rotation speed at the no load state (point D) is maintained, and just before reaching the working output point 9, the rotation speed is reverse droop-controlled (a part R in FIG. 11) to reach the rated output rotation speed.

At the time of traveling, the output characteristic of the traveling output lines 11 and 11*f* is adopted, and at the time of working, the output characteristic of the working output lines 10 and 10*f* is adopted. Accordingly, similarly to the case that the output line of FIG. 6 is adopted, drive is performed with subminimal engine output at the time of shovel work, whereby loss of output is reduced and fuel consumption is reduced. Furthermore, drive is performed with the rated engine output at the time of traveling, whereby traveling performance is secured.

In this case, compared with the embodiment 3, rotation speed at the no load state is set further lower than rotation speed at the rated output point 8 so that fuel consumption and noise at the no load state are reduced further.

Explanation has been given on the embodiment (embodiment 4) constructed by further improving the output line shown in FIG. 6 as the above.

As explained above, with regard to the embodiment 1, the hydraulic shovel 1 comprises a plurality of the engine output characteristics each of whose engine rotation speed is substantially equal to each other and the control means 3 automatically selecting the engine output characteristics following contents of work. A plurality of the engine output characteristics comprises the traveling output lines 11 and 11*c* that rotation speed is droop-controlled from the no load state so as to the rated engine output and the working output lines 10 and 10*c* that rotation speed is droop-controlled from the no load state so as not to the rated engine output.

Accordingly, drive is performed with subminimal engine output at the time of shovel work, whereby loss of output is reduced and fuel consumption is reduced.

The rated output point is confirmed easily.

With regard to the embodiment 2, a plurality of the engine output characteristics comprises the traveling output lines 11 and 11*d* that rotation speed is reverse droop-controlled from the no load state so as to the rated engine output and the working output lines 10 and 10*d* that rotation speed is droop-controlled from the no load state so as not to the rated engine output.

Accordingly, drive is performed with subminimal engine output at the time of shovel work, whereby loss of output is reduced and fuel consumption is reduced.

With regard to the embodiment 3, a plurality of the engine output characteristics comprises the traveling output lines 11 and 11*e* that rotation speed is reverse droop-controlled from the no load state so as to the rated engine output and the working output lines 10 and 10*e* that rotation speed is isochronous-controlled from the no load state so as not to the rated engine output.

Accordingly, drive is performed with subminimal engine output at the time of shovel work, whereby loss of output is reduced and fuel consumption is reduced.

Fuel consumption and noise at the no load state are reduced further.

With regard to the embodiment 4, a plurality of the engine output characteristics comprises the traveling output lines 11 and 11*f* that rotation speed is reverse droop-controlled from the no load state so as to the rated engine output and the working output lines 10 and 10*f* that rotation speed is reverse droop-controlled from the no load state so as not to the rated engine output.

Accordingly, drive is performed with subminimal engine output at the time of shovel work, whereby loss of output is reduced and fuel consumption is reduced.

Fuel consumption and noise at the no load state are reduced further.

Next, explanation will be given on an embodiment (embodiment 5) constructed by further improving the output line shown in FIG. 6 referring to FIGS. 2, 6 and 12.

As shown in FIG. 2, with regard to the embodiment 5, a mode selection means 33 is provided so that an economy mode can be selected in addition to a normal mode shown by the output line shown in FIG. 6.

Figure 12:
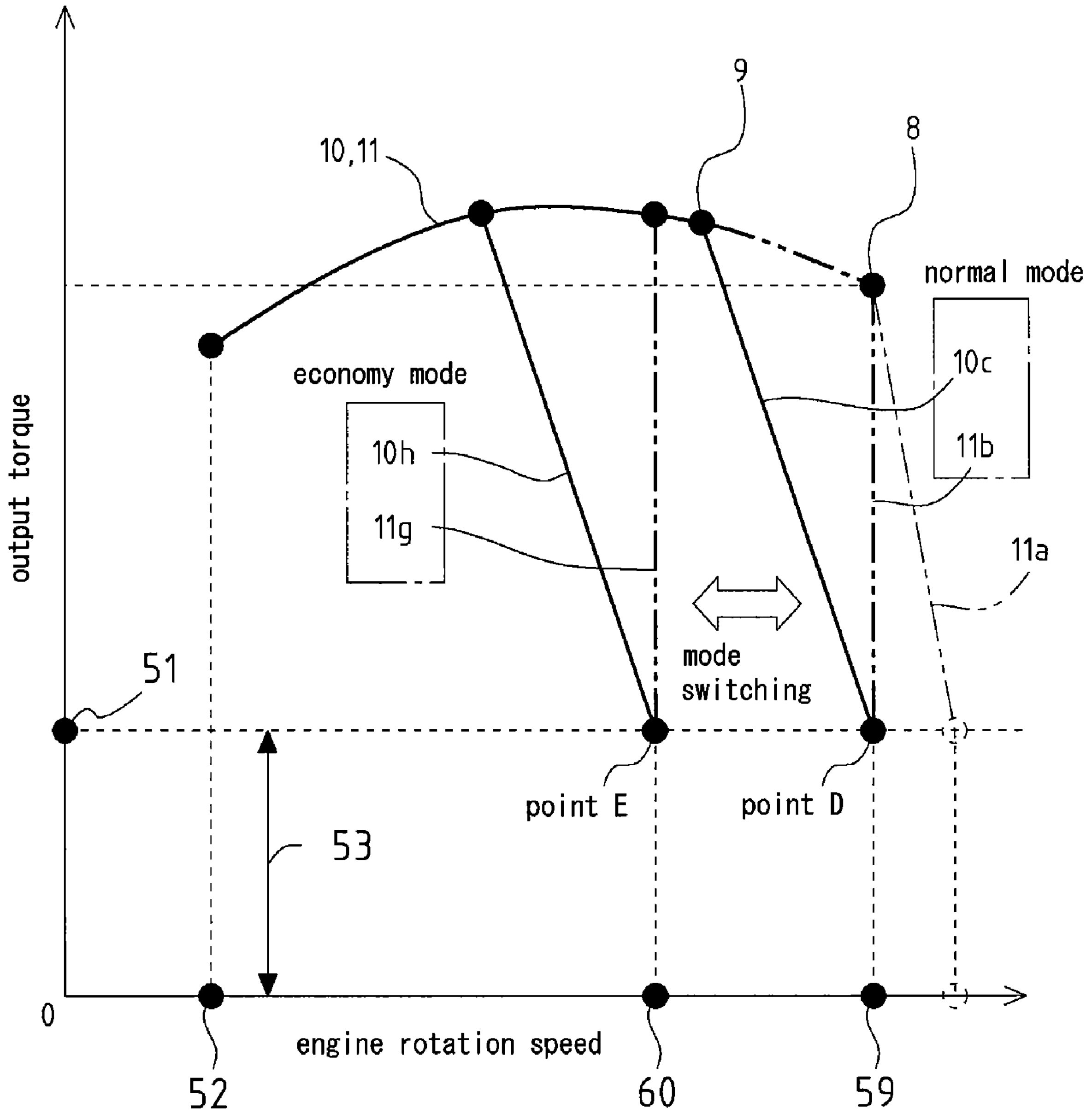
FIG. 12 is an output line of relation between output torque and engine rotation speed of an improved embodiment (embodiment 5).

As shown in FIG. 12, when the economy mode is selected, economy mode maximum rotation speed is set so as to make engine rotation speed lower than normal mode maximum rotation speed (that is, the rated engine rotation speed).

Accordingly, when the economy mode is selected, engine rotation speed is reduced so that working speed (for example, traveling speed or turning speed) is reduced. On the other hand, fuel consumption and noise are reduced and output torque is maintained equally to that at the normal mode.

Similarly to the normal mode, at the economy mode, a working output line 10*h* is a droop line (that is, performs droop control) and a traveling output line 11*g* is an isochronous line (that is, performs isochronous control) while a point E is common to the lines. Accordingly, when the normal mode and the economy mode are switched, operation feeling is maintained and an operator is not given an unpleasant feeling.

When high working speed is not required, the economy mode is selected so that fuel consumption and noise are further reduced compared with the normal mode while required traveling performance and excavating performance are secured, operation feeling is maintained and an operator is not given an unpleasant feeling.

The mode selection means 33 selecting one of the economy mode and the normal mode is provided. When the economy mode is selected, the engine rotation speed (that is, the economy mode maximum rotation speed) is set lower than the engine rotation speed at the rated driving (that is, the normal mode maximum rotation speed). Accordingly, fuel consumption and noise at the time of shovel work are further reduced without spoiling operation feeling.

Explanation has been given on the embodiment (embodiment 5) constructed by further improving the output line shown in FIG. 6 as the above.

INDUSTRIAL APPLICABILITY

The present invention is adoptable not only to a hydraulic shovel but also widely to a construction equipment and the like driven hydraulically.

The invention claimed is:

1. An engine controller of a hydraulic shovel comprising:
- an engine rotation selection means selecting one of isochronous control and droop control; and
- a detection means detecting a traveling state of a traveling device,
- wherein:
- when the detection means detects the traveling state, the engine rotation selection means selects the isochronous control and a rated driving engine rotation speed is maintained at a time of increase of output; and
- when the detection means does not detect the traveling state, the engine rotation selection means selects the droop control and engine rotation speed at a time of increase of output is lower than the rated driving engine rotation speed.

2. The engine controller of the hydraulic shovel as set forth in claim 1, wherein engine rotation speed of minimum output at the time of selecting the isochronous control is substantially equal to engine rotation speed of minimum output at the time of selecting the droop control.

3. The engine controller of the hydraulic shovel as set forth in claim 1, wherein the detection means also serves as an alarm means notifying circumference about traveling state.

4. The engine controller of the hydraulic shovel as set forth in claim 1, wherein:
- a mode selection means selecting one of economy mode and normal mode is provided, and
- when the economy mode is selected, engine rotation speed is set lower than the rated driving engine rotation speed.

5. The engine controller of the hydraulic shovel as set forth in claim 2, wherein:
- a mode selection means selecting one of economy mode and normal mode is provided, and
- when the economy mode is selected, engine rotation speed is set lower than the rated driving engine rotation speed.

* * * * *